(12) United States Patent
Takeuchi et al.

(10) Patent No.: US 6,312,235 B1
(45) Date of Patent: Nov. 6, 2001

(54) THRUST BALL BEARING AND OPEN-TYPE SCROLL COMPRESSOR (75) Inventors: Makoto Takeuchi, Nagoya; Tetsuzou Ukai, Nishi-kasugai-gun; Shigeki Miura, Nishi-kasugai-gun; Kazuhide Watanabe, Nishi-kasugai-gun, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/588,715

(22) Filed: Jun. 7, 2000

(30) Foreign Application Priority Data

Jun. 8, 1999 (JP) .................................................. 11-161693

(51) Int. Cl.[7] ...................................................... F01C 1/02
(52) U.S. Cl. ........................ 418/55.1; 384/615; 384/255; 384/492
(58) Field of Search ........................... 418/55.1; 384/615, 384/255, 492

(56) References Cited

U.S. PATENT DOCUMENTS

| 4,035,043 | * | 7/1977 | Markley | 308/174 |
| 4,533,263 | * | 8/1985 | McGuffie | 384/615 |
| 5,112,146 | * | 5/1992 | Stangeland | 384/492 |

FOREIGN PATENT DOCUMENTS

| 0 090 931 | 10/1983 | (EP) . | |
| 61-15276 | 4/1986 | (JP) . | |
| 61-241479 | 10/1986 | (JP) . | |
| 63-154878-A1 | * 6/1988 | (JP) | 418/55.1 |
| 63-179187 | 7/1988 | (JP) . | |
| 63-179186-A1 | * 7/1988 | (JP) | 418/55.1 |
| 63-308219-A1 | * 12/1988 | (JP) | 384/492 |
| 64-6406 | 2/1989 | (JP) . | |
| 5-87131 | 4/1993 | (JP) . | |
| 11-241691-A1 | * 9/1999 | (JP) | 418/55.5 |

* cited by examiner

Primary Examiner—Thomas Denion
Assistant Examiner—Theresa Trieu
(74) Attorney, Agent, or Firm—Oblon, Spivak, McClelland, Maier & Neustadt, P.C.

(57) ABSTRACT

A thrust ball bearing provided in an open scroll-type compressor can withstand a large compressive load on the bearing and prevents wear of the mating surfaces. The thrust ball bearing has a first thrust plate 9a for performing spiral revolution; a second thrust plate 4a opposing the first thrust plate 9a; and a retaining device 40 disposed between the thrust plates 4a, 9a and provided with retaining cavities 42 for retaining a ball 41 in each cavity where a radius ρ of spiral revolution of the first plate, a diameter d of the ball and a diameter D of the retaining cavity are related by an expression $D \geq d \times \rho$.

9 Claims, 8 Drawing Sheets

THRUST BALL BEARING AND OPEN-TYPE SCROLL COMPRESSOR

BACKGROUND OF THE INVENTION

1. Field of the Invention

The present invention relates in general to open-type scroll compressors, and relates in particular to an open-type scroll compressor that can be operated in the critical region of a cooling medium such as carbon dioxide to provide vapor compression cooling cycles.

2. Description of the Background Art

Figure 7:
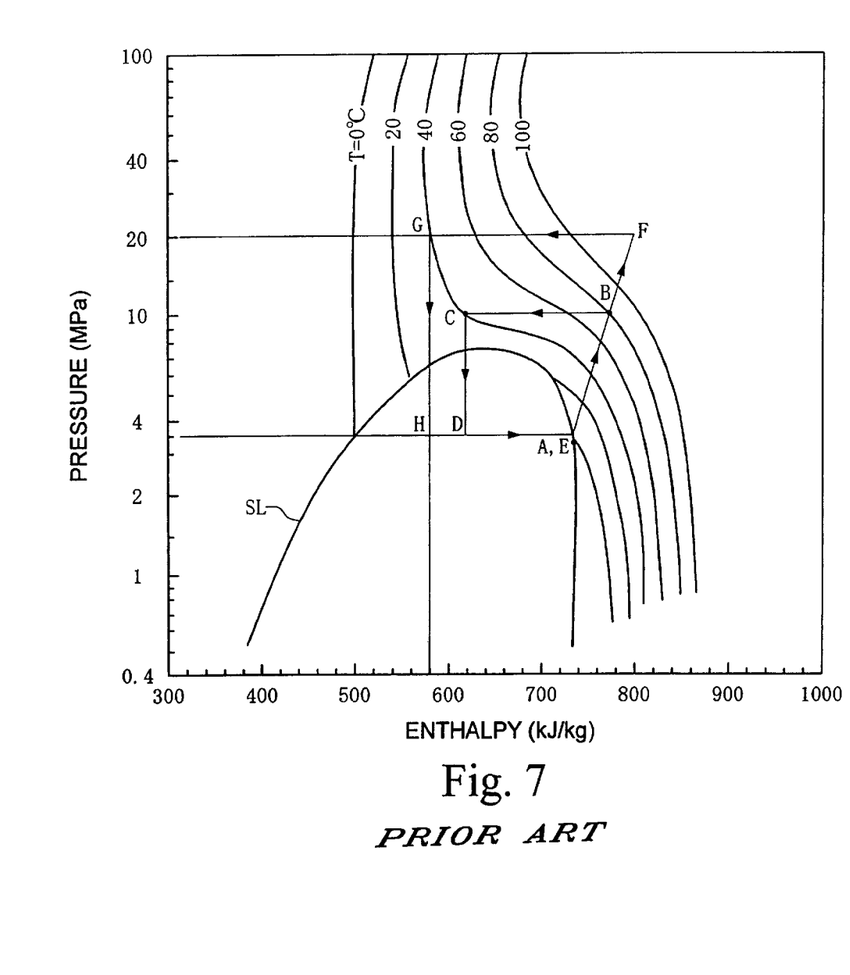
FIG. 7 is a Mollier diagram of $CO_2$.

From the standpoint of environmental protection, there has been proposals, in recent years, to use carbon dioxide gas as a replacement for freon gas as a working gas (cooling medium) to provide cooling cycles (referred to as $CO_2$ cooling cycles), for example, in a Japanese Patent Application, First Publication Hei 7-18602. The operation of the $CO_2$-based cooling cycle is similar to that of the conventional vapor compression cooling cycle based on freon. That is, as shown in FIG. 7 (using a Mollier diagram for $CO_2$) by an A-B-C-D-A cycle, the compressor compresses gas-phase $CO_2$ (A-B), and the compressed high temperature gaseous $CO_2$ is cooled in a heat dissipater (gas cooler) (B-C). Next, the gas pressure is reduced (C-D) in a pressure reducer, and the condensed liquid-phase $CO_2$ is vaporized (D-A) so that the latent heat of vaporization is gained from an external fluid medium such as air thus resulting in cooling the external fluid.

However, because the critical temperature for $CO_2$ is 31° C. which is lower than that of freon, which is the conventional cooling medium, so that when the outside temperature is high, such as during the summer season, the temperature of $CO_2$ in the heat dissipater circuit becomes higher than the critical temperature of $CO_2$. In other words, $CO_2$ does not condense at the exit-side of the heat dissipater (line BC does not cross saturated liquid line SL). Also, because the conditions at the exit-side (point C) of the heat dissipater are determined by the discharge pressure of the compressor and the temperature of $CO_2$ at the exit-side of the heat dissipater and the temperature of $CO_2$ at the exit-side of the heat dissipater is determined by the heat releasing capability of the heat dissipater and the outside temperature (not controllable), the temperature at the exit-side of the heat dissipater cannot be controlled in practice. Therefore, it follows that it is possible to control the conditions at the exit-side (point C) of the heat dissipater by controlling the discharge pressure of the compressor (heat dissipater exit-side pressure). In other words, to obtain sufficient cooling capacity (enthalpy difference) when the external temperature is high such as during the summer season, it is necessary to increase the heat dissipater exit-side pressure as shown by a cycle E-F-G-H-E. For this reason, it is necessary to increase the operating pressure of the compressor for $CO_2$-based cooling cycle compared with that for conventional freon-based cooling cycle.

For example, in an automobile air conditioner, operating pressure required for conventional R134-based (freon-based) compressor is about 3 kg/cm$^2$ while it is 40 kg/cm$^2$ for $CO_2$ based compressor, and the stationary pressure is about 15 kg/cm$^2$ for R134 (freon) while that for $CO_2$ is 100 kg/cm$^2$. Therefore, it is necessary for the compressor to be built to withstand the pressure of such a high magnitude.

Figure 8:
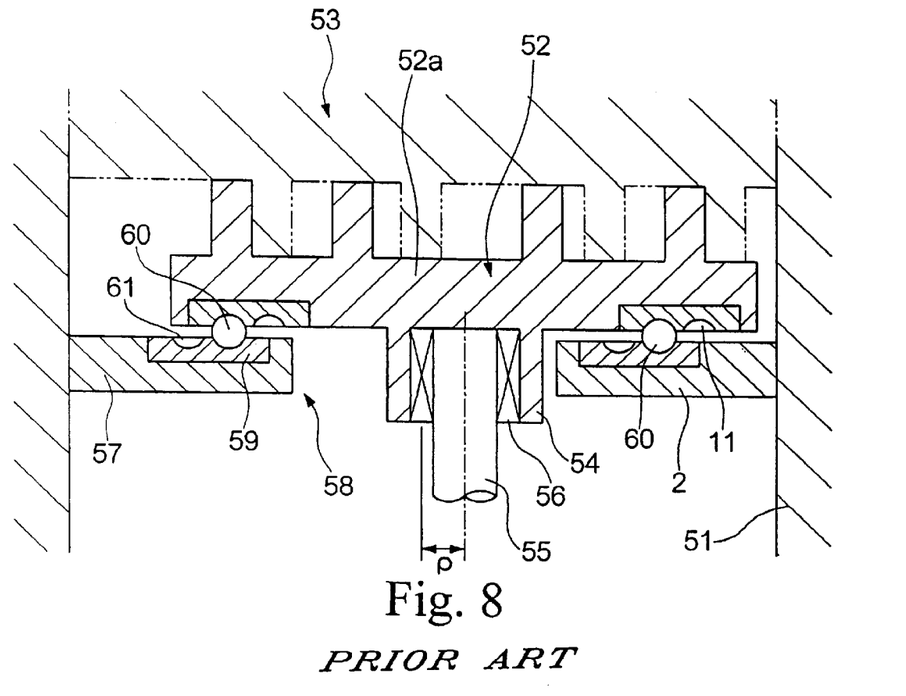
FIG. 8 is a cross sectional view of a conventional thrust ball bearing.

An example of the compressor used in the conventional automobile air conditioner is shown in FIG. 8. As shown in this diagram, a spiraling scroll 52 is provided inside a housing 51, and a fixed scroll 53 for engaging with the spiraling scroll 52 is situated above the spiraling scroll 52. Inside a cylindrical boss 54 formed in the center section of the outer surface (lower surface in the diagram) of the end plate 52a of the spiraling scroll 52, an eccentric shaft 55 is freely rotatably supported by a scroll bearing 56, which also serves as the radial bearing. The eccentric shaft 55 is able to rotate eccentrically with a radius p by means of an eccentric drive, which is omitted from the diagram.

Also, between the outer surface periphery of the end plate 52a and the fixed frame 57 fixed to the housing 51, a thrust ball bearing 58 is provided to support the spiraling scroll 52.

This thrust ball bearing 58 is comprised by a pair of ring shaped race members 59 mounted on the fixed frame 57 and the spiraling scroll 52 and balls 60 intervening between the race members 59. On opposing surfaces of the pair of race members 59, spiraling race grooves 61 are disposed in several places for providing rolling motion of the balls 60. These race grooves 61 are formed in an arc shape such that the profile radius of the groove is slightly larger than that of the balls 60.

The operation of the thrust bearing so constructed will be explained below. The spiraling scroll 52 is driven by the eccentric shaft 55 to produce spiral revolution with a scroll radius ρ. During the motion, the fixed frame 57 is coupled to the spiraling scroll 52 by means of the balls 60 intervening between the race members 59, and, because the rolling range of the balls 60 is restricted by the race grooves 61, the spiraling scroll 52 is prevented from self-rotating about its own axis.

Also, a large axial load is applied to the spiraling scroll 52 by the pressure from the compressed gas, but the axial load is supported by the balls 60 and the race members 59.

The thrust ball bearing 58 described above not only supports the load in the thrust direction but also prevents self-rotation of the spiraling scroll 52.

In other words, because the fixed frame 57 and the spiraling scroll 52 are coupled by means of the balls 60, the race grooves 61 of the race members 59 on the fixed frame side slide against the balls 60, and the race grooves 61 of the race members 59 on the spiraling scroll side slide against the balls 60.

Figure 9:
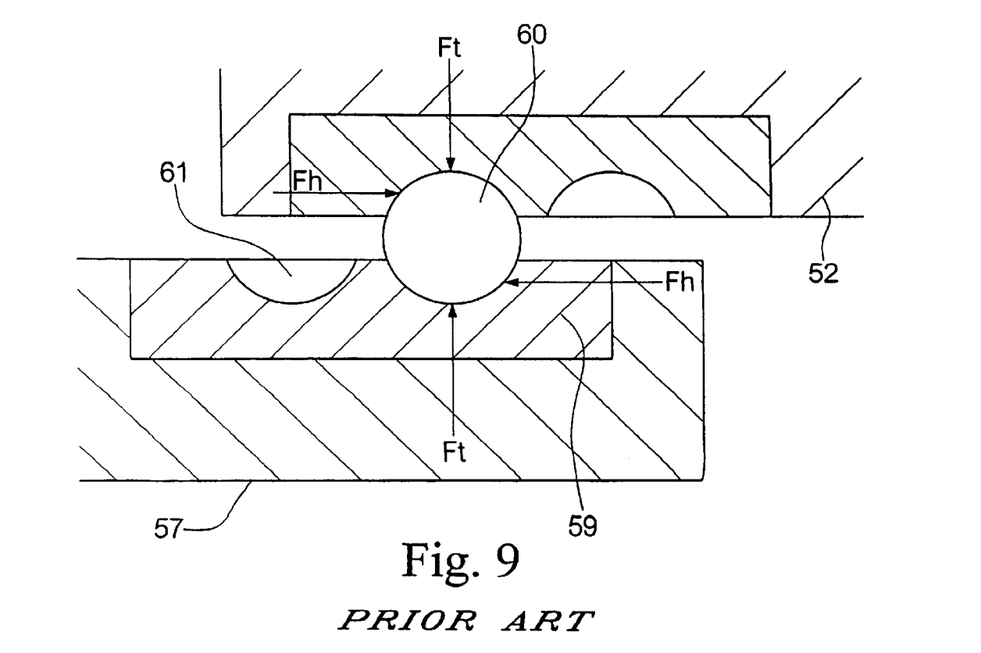
FIG. 9 is an enlarged view of the vicinity of the ball in the thrust ball bearing shown in FIG. 8.

Specifically, as shown in FIG. 9, while the ball 60 is under the load Ft in the axial direction generated by the compressed gas acting, it is also under a pressing force Fh acting in the left/right direction resulting from the tendency of the spiraling scroll 52 to self-rotate about its own axis. The ball 60 exerts a reaction force to this pressing force Fh to prevent self-rotation of the spiraling scroll 52.

However, because the ball 60 is rolling on the race groove 61, the pressing force Fh acting in the left/right direction causes the ball 60 to slide against the race groove 61, thereby generating friction at the interface. For this reason, lubrication film between the ball 60 and the race groove 61 is lost and the mechanical loss is increased, and the ball 60 and race groove 61 are worn by the friction to lead to shortening the service life of the bearing.

Frictional effects become significantly higher the higher the load on the bearing. This effect becomes particularly severe when $CO_2$ is used as the working gas because the compressed gas pressure is higher compared with freon gas, and presents a problem that the bearing service life is reduced considerably.

SUMMARY OF THE INVENTION

The object of the present invention is to provide a thrust ball bearing that can withstand higher loading than conventional thrust ball bearings while preventing frictional effects between the moving parts, and to provide an open-type scroll compressor incorporating such a thrust ball bearing.

The object has been achieved in a thrust ball bearing comprising: a first thrust plate for providing spiral revolution; a second thrust plate opposing the first thrust plate; a retaining device, provided with retaining cavities for retaining a ball in each cavity, disposed between the first thrust plate and the second thrust plate; and balls retained in said retaining cavities; wherein a radius $\rho$ of spiral revolution of the first plate, a diameter d of the balls and a diameter D of the retaining cavity are related by an expression $D \geq d+\rho$.

In this thrust ball bearing, because the diameter of each retaining cavity is related by the expression $D \geq d+\rho$, there is no interference with the revolution motion of the ball.

Figure 3A:
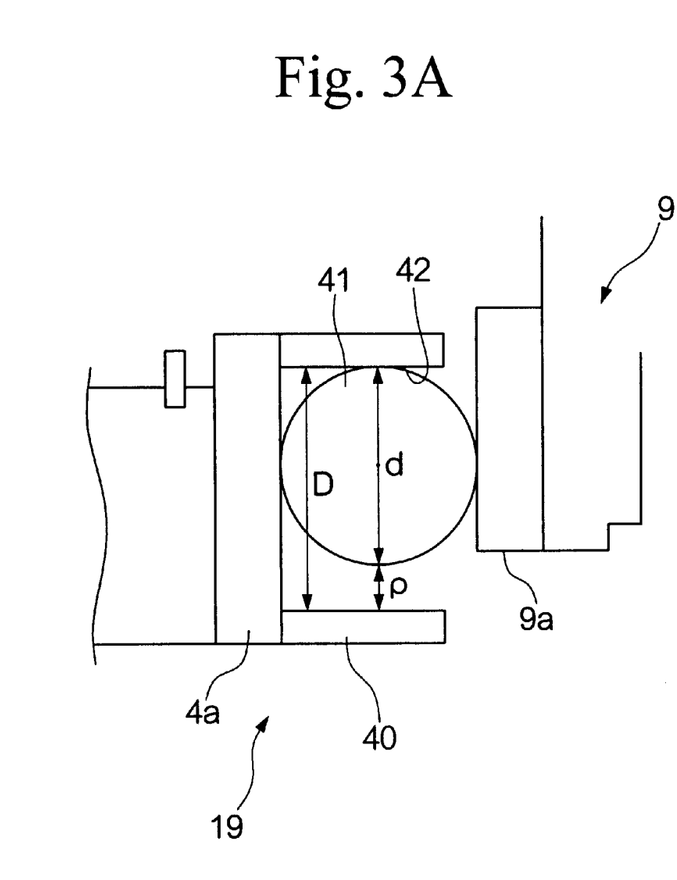
FIG. 3A, 3B are enlarged views of the vicinity of the thrust ball bearing shown in FIG. 1.

In other words, as shown in FIG. 3, ball 41 of the thrust ball bearing is under compression from the first and second thrust plate 4a, 9a, and revolves in-phase with the spiraling scroll (revolving spiral body) 9. In the condition shown in FIG. 3A, ball 41 is positioned at its uppermost position, and is in contact with the interior surface of the retaining cavity of the retaining device 40.

Figure 3B:
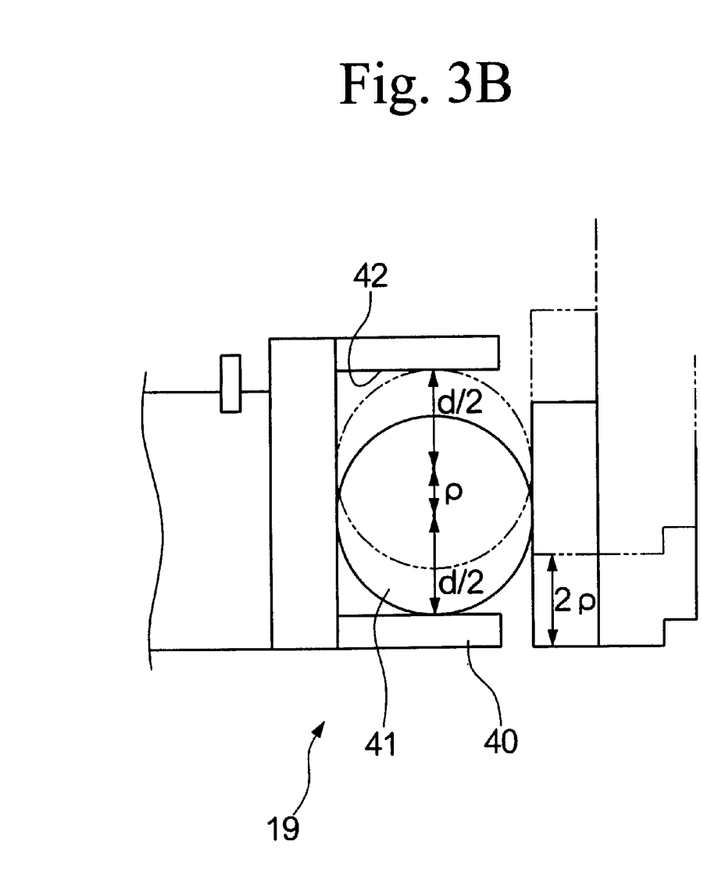

FIG. 3B shows a condition of the ball 41 when the revolving action of the spiraling scroll 9 has caused the ball 41 to move to a position 180° away from the position shown in FIG. 3A. In FIG. 3B, the ball 41 is positioned at its lowermost position, and the ball 41 is in contact with the outside surface of the retaining cavity of the retaining device 40.

Because the spiraling scroll 9 is revolving with a scrolling radius of $\rho$, the ball 41 that is revolving in contact with the spiraling scroll 9 is revolving at the scroll radius $\rho/2$. As shown in FIG. 3B, the diameter of the moving trace of the ball 41 is $d/2+\rho+d/2=d+\rho$.

Because the diameter D of the retaining cavity 42 satisfies the condition $D \geq d+\rho$, the retaining device does not interfere with the revolution motion of the ball 41.

Therefore, friction is not generated between the ball and the interior surface of the retaining cavity or thrust plate, thereby enabling to prevent the wear of the interior surface of the retaining cavity, thrust plate, and the ball.

A second aspect of the thrust ball bearing is that a noise proofing material is disposed at least on interior surfaces of the retaining cavities of the retaining device.

When the spiraling scroll starts to spiral, the balls in the thrust ball bearing start rolling from a stationary position to an operating position. When this happens the balls impact the interior surface of the retaining cavity, but because noise proofing material is provided at least on the interior surface of each retaining cavity of the retaining device, it is possible to reduce the noise level generated when the ball impacts the interior surface of each retaining cavity.

Possible noise proofing materials should include materials having a low elastic coefficient, and are effective in suppressing the noise generated when the balls hit the respective interior surfaces that are made from a material including resins, synthetic rubber and vibration-controlling alloys etc.

When using rubber and resins, the entire retaining device may be made of such materials to be economical, but if a vibration-controlling, alloy is being used, it may be more practical to provide it partially in the interior surface of the retaining cavity because of its high cost.

Furthermore, if an open scroll-type compressor is provided with the thrust ball bearing as described above, it is possible to reduce wear of the interior surface of the retaining cavity, thrust plates and the balls.

Using the open scroll type compressor provided with a noise proofing material disposed at least on interior surfaces of the retaining cavities of the retaining device, it is possible to reduce the noise level produced when the balls impact the interior surface of the retaining cavity.

In another aspect of the open scroll type compressor, the working gas for producing the cooling cycle includes carbon dioxide gas, thereby making the invention applicable to those thrust ball bearings where high operating pressure and loading are required.

The beneficial effects of present invention are summarized in the following.

According to the present invention, the diameter of the retaining cavity of the retaining device is given by the expression $D \geq d+\rho$. Therefore, friction is not generated between the interior surface of the retaining cavity and the ball so that the mechanical loss can be reduced. Further, because the wear of the interior surface of the retaining cavity, thrust plates and balls can be prevented, the service life of the thrust ball bearing can be increased and the tolerance against the bearing load on the thrust ball bearing can be increased.

According to the present invention, because the noise proofing material is provided at least in the retaining cavity of the retaining device, it is possible to reduce the noise generated by impact of the ball with the interior surface of the retaining cavity when the compressor is started up.

According to the present invention, because the wear of the retaining cavity, thrust plates and balls is prevented in the present thrust ball bearing, the load on the bearing can be increased.

According to the present invention, the noise generated when the balls impact the interior surface of the retaining cavity of the present thrust ball bearing can be reduced.

The present invention can be a thrust ball bearing operated in the cooling cycle utilizing carbon dioxide as a working gas and tolerating high working pressures and high bearing loads.

DESCRIPTION OF THE PREFERRED EMBODIMENTS

Next, preferred embodiments of the present open scroll type compressor will be explained with reference to the drawings.

Figure 6:
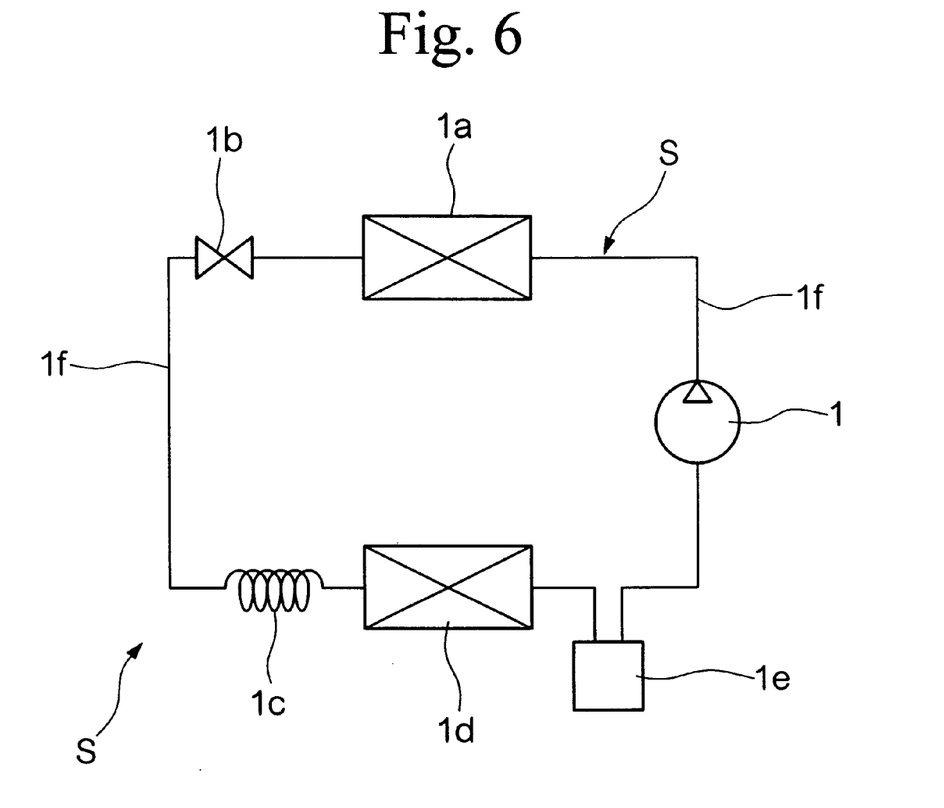
FIG. 6 is a schematic diagram to show a cooling cycle in a vapor compression type compressor.

First, a cooling cycle with $CO_2$ gas in the present scroll type compressor will be explained with reference to FIG. 6. The $CO_2$ cycle S in this compressor represents an example of the application to automobile air conditioner comprising open scroll-type compressor 1 (referred to as the compressor 1 hereinbelow) that compresses gas-phase $CO_2$. The compressor 1 is operated by a driving device, an engine in this case, which is omitted in the diagram. A gas cooler (heat dissipater) 1a cools the compressed $CO_2$ by heat exchange with the open air, and choke 1c controls an exit pressure of the gas cooler 1a according to the temperature of $CO_2$ at the exit-side of the gas cooler 1a. The pressure of $CO_2$ gas is reduced by the actions of the pressure control valve 1b and a choke 1c, and the gaseous $CO_2$ transforms into a two-phase $CO_2$ comprised by a low-pressure liquid phase and a vapor phase at a low-temperature. A vaporizer (heat absorber) 1d serves as a car air cooling device, and the two-phase $CO_2$ in the vaporizer gassifies (vaporizes) by obtaining the latent heat of vaporization from the car interior air, thereby cooling the interior air. An accumulator 1e temporarily stores vapor phase $CO_2$. The compressor 1, gas cooler 1a, pressure control valve 1b, choke 1c, vaporizer 1d and an accumulator 1e are interconnected with each other by respective piping 1f to form a close circuit.

An embodiment of the compressor 1 will be explained with reference to FIGS. 1–4.

Figure 1:
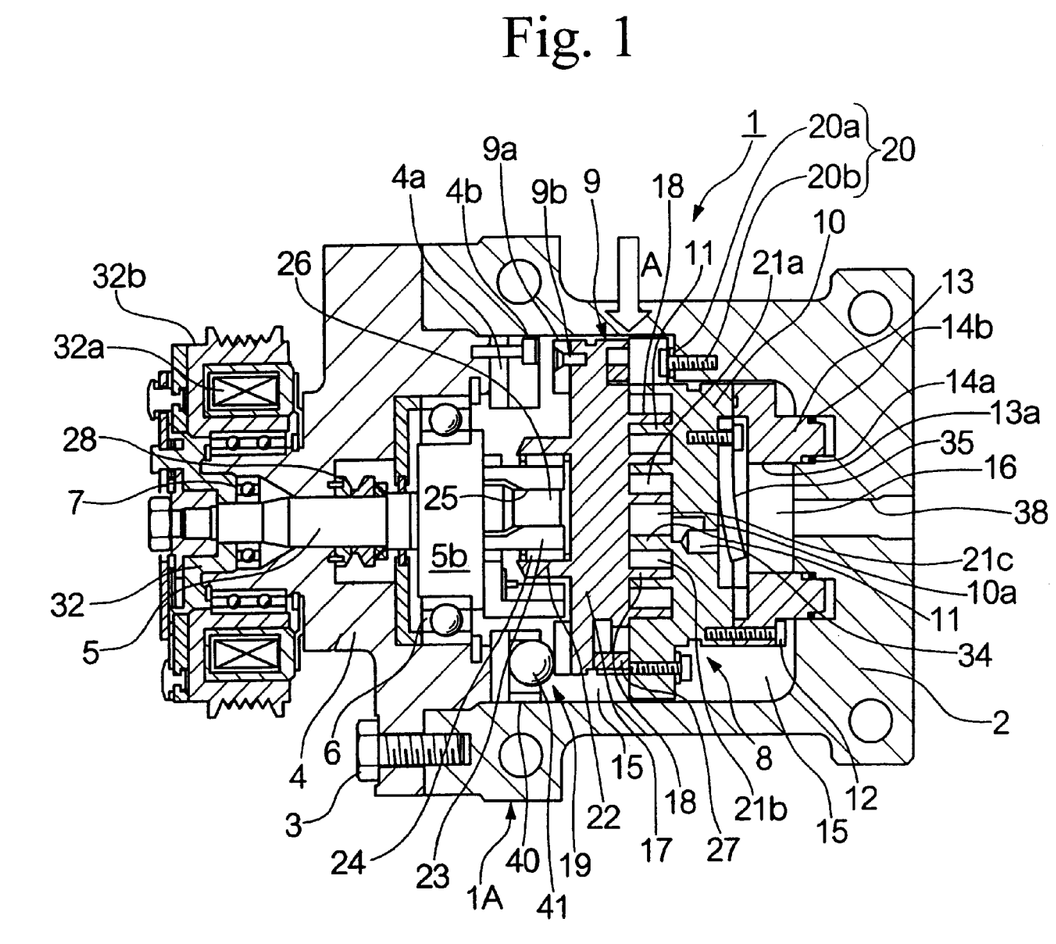
FIG. 1 is a cross sectional view of an embodiment of the open scroll-type compressor of the present invention.

The compressor 1 is provided with a housing 1A (compressor main body) and the housing 1A is comprised by a cup-shaped main casing 2 and a front casing 4 linked to the main casing 2 by means of bolts 3. A crank shaft 5 gets through the front casing 4, and is freely rotatably supported in the front casing 4 through a main bearing 6 and a sub-bearing 7. The crank shaft 5 is operated by transmitting the rotational force of the car engine (not shown) by means of a known type of electromagnetic clutch 32. Here, the reference numerals 32a, 32b refers to a coil and a pulley of the electromagnetic clutch 32

In the interior of the housing 1A are disposed a fixed scroll 8 and a spiraling scroll (revolving spiral member) 9.

The fixed scroll 8 is provided with an edge plate 10 and a spiral protrusion 11 erected on the inside surface of the edge plate 10, and a back pressure block 13 is undetachably fixed to the back surface of the edge plate 10 by means of bolts 12. O-rings 14a, 14b are embedded respectively on the internal and external peripheries of the back pressure block 13, and serve to isolate a high pressure chamber 16 (to be described later) from a low pressure chamber 15 disposed within the main casing 2 by intimately contacting the inside surface of the main casing 2. The high pressure chamber 16 is comprised by an interior space 13a of the back pressure block 13 and a depression 10a formed on the back surface of the end plate 10 of the fixed scroll 8.

The spiraling scroll 9 is provided with an end plate 17 and a spiral protrusion 18 erected on the inside surface of the end plate 17, and the shape of the spiral protrusion 18 is essentially the same as that of the spiral protrusion 11 of the fixed scroll 8.

A ring-shaped plate spring 20a is disposed between the fixed scroll 8 and the front casing 4, and is joined around its periphery by means of bolts 20b, alternately, to fixed scroll 8 and front casing 4. By this arrangement, the fixed scroll 8 is allowed to move only in the axial direction to a maximum allowable deflection of the plate spring 20a (float structure). Also, the ring-shaped plate spring 20a and bolts 20b constitute a fixed scroll support device 20. Because of the provision of a space c provided between the protrusion section of the back pressure block 13 and the housing 1A, the back pressure block 13 is able to move in the axial direction along with the fixed scroll 8.

The fixed scroll 8 and the spiraling scroll 9 are offset by a radius of the spiral revolution and before they are coupled to each other as illustrated, they are rotated with respect to the other so as to be out of phase by 180 degrees, and a chip seal (not shown) imbedded at the tip of the spiral protrusion 11 touches the inside surface of the end plate 17, and a chip seal (not shown) imbedded at the tip of the spiral protrusion 18 touches the inside surface of the end plate 10, and the side surface of the spiral protrusions 11 and that of the spiral protrusions 18 touch each other intimately at several locations. This arrangement delineates a plurality of sealed spaces 21a, 21b that are distributed approximately symmetrically about the center of the spiral protrusions. Between the fixed scroll 8 and the spiraling scroll 9 is provided a self-rotation prevention ring 27 for preventing rotation of the spiraling scroll 9 about its own axis while permitting it to revolve about the eccentric shaft.

In the interior of a cylindrical boss 22 formed in the center section of outer surface of the end plate 17, a drive bushing 23 is freely rotatably housed in a spiral bearing 24 that serves also as a radial bearing, and an eccentric shaft 26 extended to the inner end of the crank shaft 5 is freely rotatably coupled into a throughhole 25 bored into the drive bushing 23.

A known mechanical seal 28 is disposed on the outer periphery of the crank shaft 5, and the mechanical seal 28 is provided on the outer side of the main bearing 6.

Also, between the outer surface of the end plate 17 and the front casing 4, a thrust ball bearing 19 is disposed for supporting the spiraling scroll 9. Details of the thrust ball bearing will be explained below.

Ring-shaped thrust plates 4a, 9a are disposed in association with the front casing 4 and the spiraling scroll 9, respectively, about the eccentric shaft 26. The thrust plate 4a is fastened to the front casing 4 by means of bolts 4b, and the thrust plate 9a is fastened to the back surface of the end plate 17 of the spiraling scroll 9 by means of bolts 9b.

The thrust plate 9a associated with the spiraling scroll 9 is made of a flat plate material. The opposing thrust plate 4a is attached to a retaining device 40. The retaining device 40 together with the thrust plate 4a is attached as a unit to the front casing 4 by means of bolts 4b.

Figure 2:
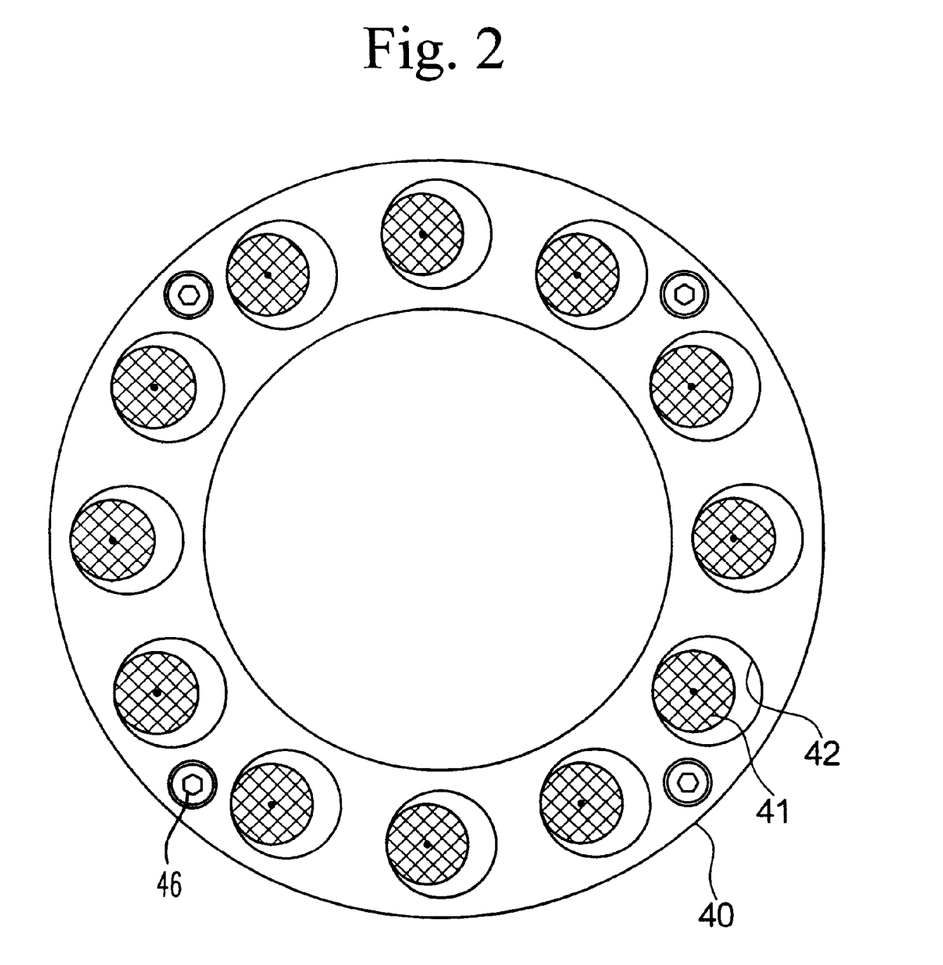
FIG. 2 is a plan view of a retaining device of the thrust ball bearing used in the open scroll-type compressor.

As shown in FIG. 2, the retaining device 40 is a ring-shaped device made of a polymeric resin to serve as a noise reducer. The material of the retaining device 40 may include nylon, Teflon and epoxy resins.

Also, the balls 41 serving as a rolling member are held individually in a plurality of retaining cavities 42 disposed circularly, and the diameter D of the retaining cavity is given by a relation D=d+ρ, as shown in FIG. 3A where ρ represents scroll radius of the spiraling scroll 9 and d represents the diameter of the ball 41. Also, the thickness of the retaining device 40 is made thinner than the ball diameter d, so that a ball 41 retained in the retaining device 40 extends beyond the wall surface of the retaining device 40 and abuts thrust plates 4a, 9a.

Next, the operation of the scroll type compressor 1 will be explained.

When the electromagnetic clutch is turned on, the rotational force of the car engine is transmitted to the crank shaft 5, which transmits the rotational force to the spiraling scroll 9 by means of the spiral drive mechanism comprised by the eccentric shaft 26, throughhole 25, drive bushing 23, spiral bearing 24, and the boss 22, so that the spiraling scroll 9 is made to undergo a circular trace generated by a spiraling revolution with the revolving scroll radius ρ while the rotation of the spiraling scroll 9 itself is being prevented by the action of the self-rotation prevention ring 27.

When the spiraling scroll 9 revolves, the line contact sections formed by the spiral protrusions 11, 18 gradually moves towards the center of the spiral, causing the sealed spaces 21a, 21b to move towards the center of the spiral while reducing the volume of the sealed spaces 21a, 21b. This movement between the spirals causes that the working gas introduced through the inlet opening into the low pressure chamber 15 (represented by a broad arrow A in FIG. 1) is trapped inside the sealed space 21 a from outer end opening sections of the two spiral protrusions 11, 18 and is led to the center section 21c while it is being compressed, and the compressed gas passes through a discharge port 34 bored into the end plate 10 of the fixed scroll 8 and pushes open the discharge valve 35 to jet into the high pressure chamber 16 and flows out of the discharge opening 38. Accordingly, due to the spiraling motion of the spiraling scroll 9, the fluid introduced from the low pressure chamber 15 is compressed within the sealed spaces 21a, 21b, and the compressed gas is discharged.

And, although the spiraling scroll 9 is pressed in the axial direction due to the pressing force of the compressed gas, the thrust ball bearing 19 supports this load.

In the following, the function of the thrust ball bearing 19 will be explained.

FIG. 3A shows an enlarged view of the thrust ball bearing 19, when the spiraling scroll 9 is in its uppermost position.

A ball 41 in the thrust ball bearing 19 is clamped between the thrust plates 4a (a second thrust plate) and 9a (first thrust plate), and revolves in-phase with the spiraling scroll 9. In the condition shown in this diagram, the ball 41 is in its uppermost position, and is in contact with the interior surface of the inside wall of the retaining cavity 42 of the retaining device 40.

FIG. 3B shows a condition of the ball 41 when the revolving action of the spiraling scroll 9 has caused the ball 41 to move to a position 180° away from the position shown in FIG. 3A. In FIG. 3B, the ball 41 is in its lowest position, and is in contact with the interior surface of the outside wall of the retaining cavity 42 of the retaining device 40.

As described earlier, the spiraling scroll 9 is revolving with a scroll radius ρ so that the ball 41 which rolls in contact with the spiraling scroll 9 revolves with a scroll radius ρ/2. As shown in FIG. 3B, the diameter of the motion trace of the ball 41 is given by d/2+ρ+d/2=d+ρ.

Because the diameter D of the retaining cavity 42 is given by a relation D=d+ρ, it means that the ball 41 will always roll in contact with the interior surface of the retaining cavity 42 while it is revolving.

In this design of the thrust ball bearing 19, because the thrust plate 9a is made of a flat plate, it does not bind with the ball 41. Also, because the diameter of the retaining cavity 42 is D=d+ρ, the cavity does not interfere with the rolling action of the ball 41.

Therefore, friction is not generated between the interior surface of the retaining cavity 42 and the ball 41, so that the efficiency of the compressor can be improved. Also, because the attrition effects among the retaining cavity 42, ball 41, thrust plates 4a, 9a are prevented, the load tolerance on the bearing can be increased.

Furthermore, because the retaining device itself is made of a polymeric resin, the following beneficial effects can be expected.

During the compression operation, the balls undergo revolving motion within the retaining cavity. During this period, because the revolution phase of the spiraling scroll 9 matches the revolution phase of the ball 41, as shown in FIG. 4A, the rolling direction "a" of the ball 41 always coincides with the tangential directions "1" of the ball 41 and the retaining cavity 42 so that the ball 41 can move without colliding with the interior surface of the retaining cavity 42.

However, during the startup time of the compressor, the ball 41 may impact the interior surface of the retaining cavity 42. For example, the cases shown in FIGS. 4A, 4B relate to such a situation. In both cases, it is assumed that the revolution phases of the spiraling scroll 9 are matching. In this phase, during the operation of the compressor, the ball 41 is always in the location shown in FIG. 4A so that there is no danger of the ball 41 colliding with the interior surface of the retaining cavity 42. However, during the startup time of the compressor, the location of the ball 41 is indeterminate, so that if it is in a location shown in FIG. 4B, for example, the rolling direction "a" of the ball 41 differs from the tangential direction "1" of the ball 41 and the retaining cavity 42. Therefore, the ball 41 collides with the interior surface of the retaining cavity 42.

Figure 4A:
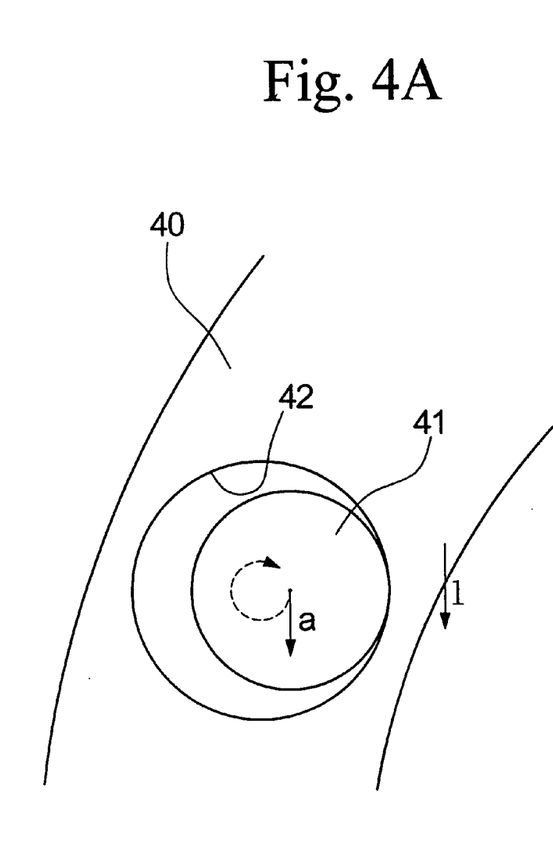
FIG. 4A, 4B are diagrams to show the rolling directions of the ball in the above thrust ball bearing.

Afterward, when the rolling direction "a" of the ball 41 and the tangential direction "1" of the retaining cavity 42 coincide (that is, revolution phases of the spiraling scroll 9 and that of the ball 41 are matched), the ball begins a revolving motion as shown in FIG. 4A.

Figure 4B:
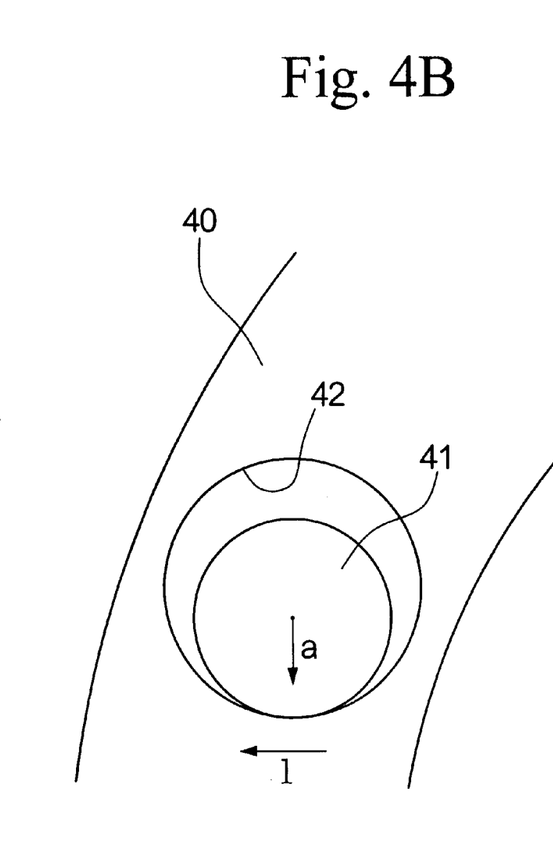

As above mentioned, the ball 41 collides with the interior surface of the retaining cavity 42, but the noise during the startup is reduced because the ball retaining device 40 is made of polymeric resin.

Here, in the above embodiment, although the diameter of the retaining cavity 42 provided in the retaining device 40 is given by D=d+ρ, it is only necessary to select the diameter D so as not to interfere with the rolling motion of the ball 41, and therefore, it is sufficient for the relation to be D≧d+ρ. When D=d+ρ, ball 41 rolls while touching the interior surface of the retaining cavity 42, and when D≧d+ρ, ball 41 rolls without touching the interior surface of the retaining cavity 42.

Further, the interior surface of the retaining cavity 42 may be shaped in a shape other than a cylindrical shape as described below.

Figure 5:
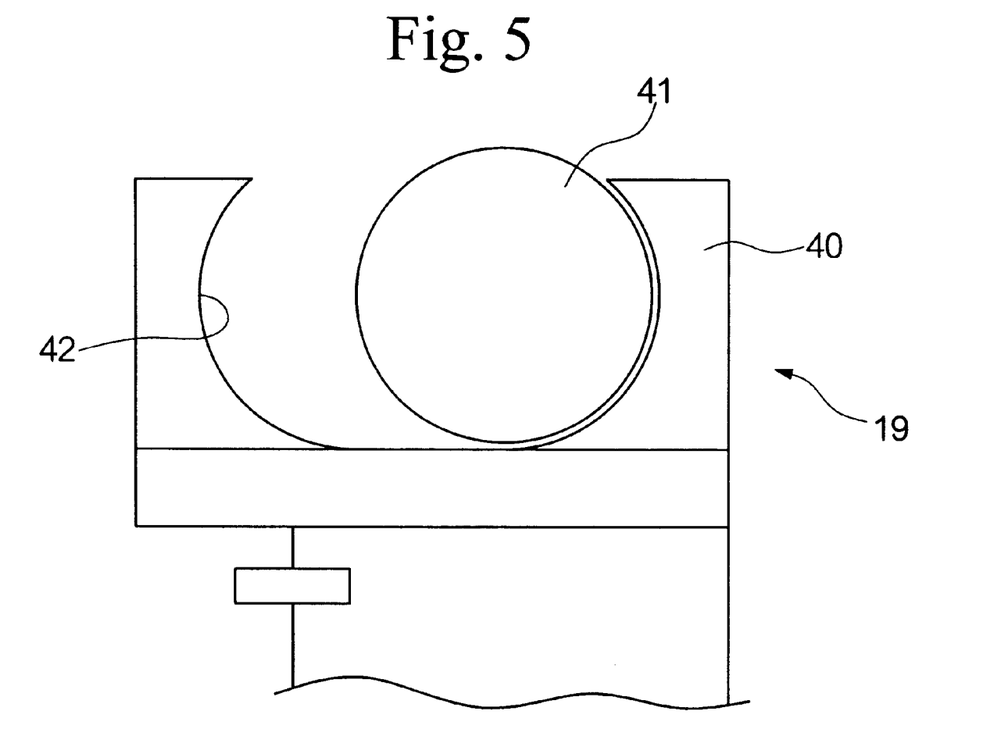
FIG. 5 is a cross sectional view of the retaining device of the thrust ball bearing in another embodiment of the present invention.

That is, as shown in FIG. 5, the interior surface of the retaining cavity 42 is made as a concave shaped to correspond to the curvature of the ball 41. The diameter D of the retaining cavity 42 is made as large as possible. In this case, the ball 41 and the convex surface of the retaining cavity 42 contact each other over an area, so that the contact area is increased and the contact stress is reduced.

Further, in the above embodiment, the retaining device 40 was attached to the front casing 4 together with the thrust plate 4a, but the installation site of the retaining device 40 is not limited to this location, and it may be attached to either the spiraling scroll 9 or the thrust plate 9a.

Also, although the retaining device 40 itself was made of a resin material, it is only necessary that the interior surface of the ball retaining device 42 be made of a resin material, and a resin ring member inserted in the cavity of a non-resin retaining device 40 may be used, for example.

Furthermore, other material for suppressing the noise, for example rubber or vibration-controlling materials may substitute for the resin material.

Also, in the above embodiment, the open scroll type compressor was operated using a $CO_2$ cooling cycle, but it is not necessary to limit to such a system, and it is permissible to use other working gases such as freon for the vapor compression type cooling cycle.

What is claimed is:

1. A thrust ball bearing comprising:

a first thrust plate for performing spiral revolution;

a second thrust plate opposing the first thrust plate; and a retaining device, provided with retaining cavities for retaining a ball, disposed between the first thrust plate and the second thrust plate; wherein a radius $\rho$ of spiral revolution of the first plate, a diameter d of the ball and a diameter D of the retaining cavity are related by the expression $D \geq d+\rho$; and wherein said retaining device is fixed to either said first thrust plate or said second thrust plate.

2. A thrust ball bearing according to claim 1, wherein a noise proofing material is disposed at least on interior surfaces of the retaining cavities of the retaining device.

3. An open scroll-type compressor comprising a spiraling scroll provided in a compressor main body and a thrust ball bearing for freely supporting the spiraling scroll to enable spiral revolution of the spiraling scroll; said compressor compressing an introduced working gas and flowing out the compressed gas by spiral revolution motion generated by a spiraling scroll; wherein said thrust ball bearing is comprised by a first thrust plate for performing spiral revolution;

a second thrust plate opposing the first thrust plate; and a retaining device, provided with retaining cavities for retaining a ball, disposed between the first thrust plate and the second thrust plate; wherein a radius $\rho$ of spiral revolution of the first plate, a diameter d of the ball and a diameter D of the retaining cavity are related by the expression $D \geq d+\rho$; and wherein said retaining device is fixed to either said first thrust plate or said second thrust plate.

4. An open scroll type compressor according to claim 3, wherein a noise proofing material is disposed at least on interior surfaces of the retaining cavities of the retaining device.

5. An open scroll type compressor according to one of claim 3 or 4, wherein said working gas includes carbon dioxide gas.

6. A thrust ball bearing comprising:

a first thrust plate for performing spiral revolution;

a second thrust plate opposing the first thrust plate; and a retaining device, provided with retaining cavities for retaining a ball, disposed between the first thrust plate and the second thrust plate; wherein a radius $\rho$ of spiral revolution of the first plate, a diameter d of the ball and a diameter D of the retaining cavity are related by the expression $D \geq d+\rho$; and wherein said retaining device is fixed to said first thrust plate.

7. An open scroll-type compressor comprising a spiraling scroll provided in a compressor main body and a thrust ball bearing for freely supporting the spiraling scroll to enable spiral revolution of the spiraling scroll; said compressor compressing an introduced working gas and flowing out the compressed gas by spiral revolution motion generated by a spiraling scroll; wherein said thrust ball bearing is comprised by a first trust plate for performing spiral revolution;

a second thrust plate opposing the first thrust plate; and a retaining device, provided with retaining cavities for retaining a ball, disposed between the first thrust plate and the second thrust plate; wherein a radius $\rho$ of spiral revolution of the first plate, a diameter d of the ball and a diameter D of the retaining cavity are related by the expression $D \geq d+\rho$; and wherein said retaining device is fixed to said first thrust plate.

8. A thrust ball bearing comprising:

a first thrust plate for performing spiral revolution;

a second thrust plate opposing the first thrust plate; and a retaining device, provided with retaining cavities for retaining a ball, disposed between the first thrust plate and the second thrust plate; wherein a radius $\rho$ of spiral revolution of the first plate, a diameter d of the ball and a diameter D of the retaining cavity are related by the expression $D \geq d+\rho$; and wherein said retaining device is fixed to said second thrust plate.

9. An open scroll-type compressor comprising a spiraling scroll provided in a compressor main body and a thrust ball bearing for freely supporting the spiraling scroll to enable spiral revolution of the spiraling scroll; said compressor compressing an introduced working gas and flowing out the compressed gas by spiral revolution motion generated by a spiraling scroll; wherein said thrust ball bearing is comprised by a first thrust plate for performing spiral revolution;

a second thrust plate opposing the first thrust plate; and a retaining device, provided with retaining cavities for retaining a ball, disposed between the first thrust plate and the second thrust plate; wherein a radius $\rho$ of spiral revolution of the first plate, a diameter d of the ball and a diameter D of the retaining cavity are related by the expression $D \geq d +\rho p$; and wherein said retaining device is fixed to said second thrust plate.

* * * * *